United States Patent
Ramos (10) Patent No.: US 12,461,901 B2
(45) Date of Patent: Nov. 4, 2025

(54) AUTOMATIC DATABASE MAINTENANCE AND SEARCH

(71) Applicant: SAP SE, Walldorf (DE)

(72) Inventor: Micael Flores Ramos, Morro Reuter (BR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/425,883

(22) Filed: Jan. 29, 2024

(65) Prior Publication Data

US 2025/0124010 A1    Apr. 17, 2025

Related U.S. Application Data

(60) Provisional application No. 63/589,485, filed on Oct. 11, 2023.

(51) Int. Cl.
| | |
|---|---|
| *G06F 16/00* | (2019.01) |
| *G06F 16/215* | (2019.01) |
| *G06F 16/245* | (2019.01) |
| *G06Q 50/14* | (2012.01) |

(52) U.S. Cl.
CPC .......... *G06F 16/215* (2019.01); *G06F 16/245* (2019.01); *G06Q 50/14* (2013.01)

(58) Field of Classification Search
None
See application file for complete search history.

(56) References Cited

U.S. PATENT DOCUMENTS

| | | | | |
|---|---|---|---|---|
| 9,430,571 | B1 * | 8/2016 | Carter | G06F 16/9535 |
| 10,276,170 | B2 * | 4/2019 | Gruber | G06F 16/9537 |
| 10,791,176 | B2 * | 9/2020 | Phipps | G10L 15/18 |
| 11,405,466 | B2 * | 8/2022 | Phipps | H04L 67/1095 |
| 12,087,308 | B2 * | 9/2024 | Gruber | G06F 16/9537 |
| 2009/0012824 | A1 * | 1/2009 | Brockway | G06Q 10/02 705/6 |
| 2013/0275164 | A1 * | 10/2013 | Gruber | G06F 16/2457 705/5 |

(Continued)

OTHER PUBLICATIONS

Concur.com [online], "Buckle in, tray tables up: Concur Travel's biggest update in years is about to take off" Sep. 11, 2023, retrieved on Jan. 29, 2024, retrieved from URL <https://www.concur.com/blog/article/buckle-in-tray-tables-up-concur-travels-biggest-update-in-years-is-about-to-take-off>, 7 pages.

(Continued)

*Primary Examiner* — Farhan M Syed (74) *Attorney, Agent, or Firm* — Fish & Richardson P.C.

(57) ABSTRACT

This disclosure describes systems, software, and computer implemented methods for maintaining travel databases and providing improved search results from them. Implementations include querying a plurality of data sources using a plurality of extractors. The plurality of extractors can receive travel information from the plurality of data sources and populate a software object with the travel information to generate structured travel information which can be submitted to an extraction queue. A data keeper can extract structured travel information of the particular category from the extraction queue and submit the structured travel information to a database queue. A canonical database manager (CDM) can extract the structured travel information of the particular category from the database queue.

19 Claims, 4 Drawing Sheets

(56) References Cited

U.S. PATENT DOCUMENTS

2018/0260742 A1\* 9/2018 Li .................... G06K 19/06028
2020/0143495 A1\* 5/2020 Hewitt .................. G06Q 10/02
2021/0133847 A1\* 5/2021 Mezaael ............. G01C 21/343

OTHER PUBLICATIONS

SAP Concur [online], "Concur Travel: The New Travel Experience" Aug. 14, 2023, retrieved on Jan. 29, 2024, <https://www.youtube.com/watch?v=bWii9LiNlaU>, 1 page [Video Submission].

\* cited by examiner

AUTOMATIC DATABASE MAINTENANCE AND SEARCH

CLAIM OF PRIORITY

This application claims priority under 35 USC § 119 (e) to U.S. Patent Application Ser. No. 63/589,485, filed on Oct. 11, 2023, the entire contents of which are hereby incorporated by reference.

BACKGROUND

Travel booking involves combining large quantities of information from diverse sources, that update or change frequently. In order to enable a user to easily identify available bookings, databases must be readily searchable, despite containing vast amounts of data. Further they must be maintained up to date, as flight information, hotel availability, and other information can change rapidly (e.g., on a daily, or hourly basis).

SUMMARY

The present disclosure involves systems, software, and computer implemented methods for maintaining travel databases and providing improved search results from them. Implementations include querying a plurality of data sources using a plurality of extractors. The plurality of extractors can receive travel information from the plurality of data sources and populate a software object with the travel information to generate structured travel information. The structured travel information can be submitted to an extraction queue which is monitored by a data keeper of a plurality of data keepers, each data keeper associated with a particular category. The data keeper can extract structured travel information of the particular category from the extraction queue, and submit the structured travel information to a database queue that includes structured travel information of a plurality of categories. A canonical database manager (CDM) that is associated with the particular category can extract the structured travel information of the particular category from the database queue. The CDM can be one of a plurality of CDMs.

Implementations can optionally include one or more of the following features.

In some instances, the data keeper can deduplicate the structured travel information of the particular category prior to submitting it to the database queue.

In some instances, the travel information received from the plurality of data sources includes fees, one or more locations, and amenities.

In some instances, a user query including a location is received, and in response a places CDM queries an API associated with a location service, receives location information associated with the location, and updates a location canonical database with the location information.

In some instances, the CDM can update a canonical database based on the structured travel information of the particular category, where the canonical database is associated with the particular category.

In some instances, deduplicating the structured travel information of the particular category includes merging data associated with a same travel element from different data sources of the plurality of data sources, and prioritizing conflicting data associated with the same travel element from the different data sources based on the data source. In some instances, the same travel element is at least one of a particular flight, particular rail connection, particular accommodation, or a particular rental vehicle.

The details of these and other aspects and embodiments of the present disclosure are set forth in the accompanying drawings and the description below. Other features, objects, and advantages of the disclosure will be apparent from the description, drawings, and claims.

DESCRIPTION OF DRAWINGS

Some example embodiments of the present disclosure are illustrated by way of example and not limitation in the figures of the accompanying drawings, in which like reference numbers indicate similar elements.

DETAILED DESCRIPTION

This disclosure describes methods, software, and systems for maintaining travel databases and providing improved search results from them.

In general, in order to provide online booking functionality, a search program needs to be able to search large datasets of rapidly changing information, including flights, buses, rail connections, accommodations (for example, hotels), vehicle rentals, and more. Each of these categories of travel bookings, sometimes referred to as a "vertical", can include data such as location, price, time of departure, time of arrival, amenities, etc. that can change routinely. Further still, flights, airports, hotels, rental facilities, rail stations, and others can open or be added, as well as closed or be canceled. Thus, in order to provide the ability to search and book travel, several large datasets need to be regularly updated and maintained in order to ensure the user receives up to date, valid, or "canonical" information when making bookings.

The described solution uses multiple canonical databases, each database configured to maintain data for a particular vertical or category of booking, and each canonical database automatically maintained with up-to-date information using a canonical database manager (CDM). The CDMs can each monitor a feed of extracted data for information relevant to their particular vertical, and can update their canonical databases accordingly. This enables each database to update independently of the others. For example, airline flight pricing may change hourly, and thus that canonical database can be updated every hour. However, the hotel pricing may only vary daily, and so the hotel CDM can update its database at a daily rate. To provide accurate, up-to-date information for the feed of extracted data, a series of extractors, data keepers, and replicators can operate autonomously to extract information and curate it, merging and de-duplicating the data during the extraction process. By processing the data at this low level, overall bandwidth is reduced as less total data needs to be submitted to the data feed. Further, improved flexibility is enabled as it is simpler to add or remove data sources and data types, requiring only modifications of the low-level structure, without affecting the higher-level database and search components.

Figure 1A:
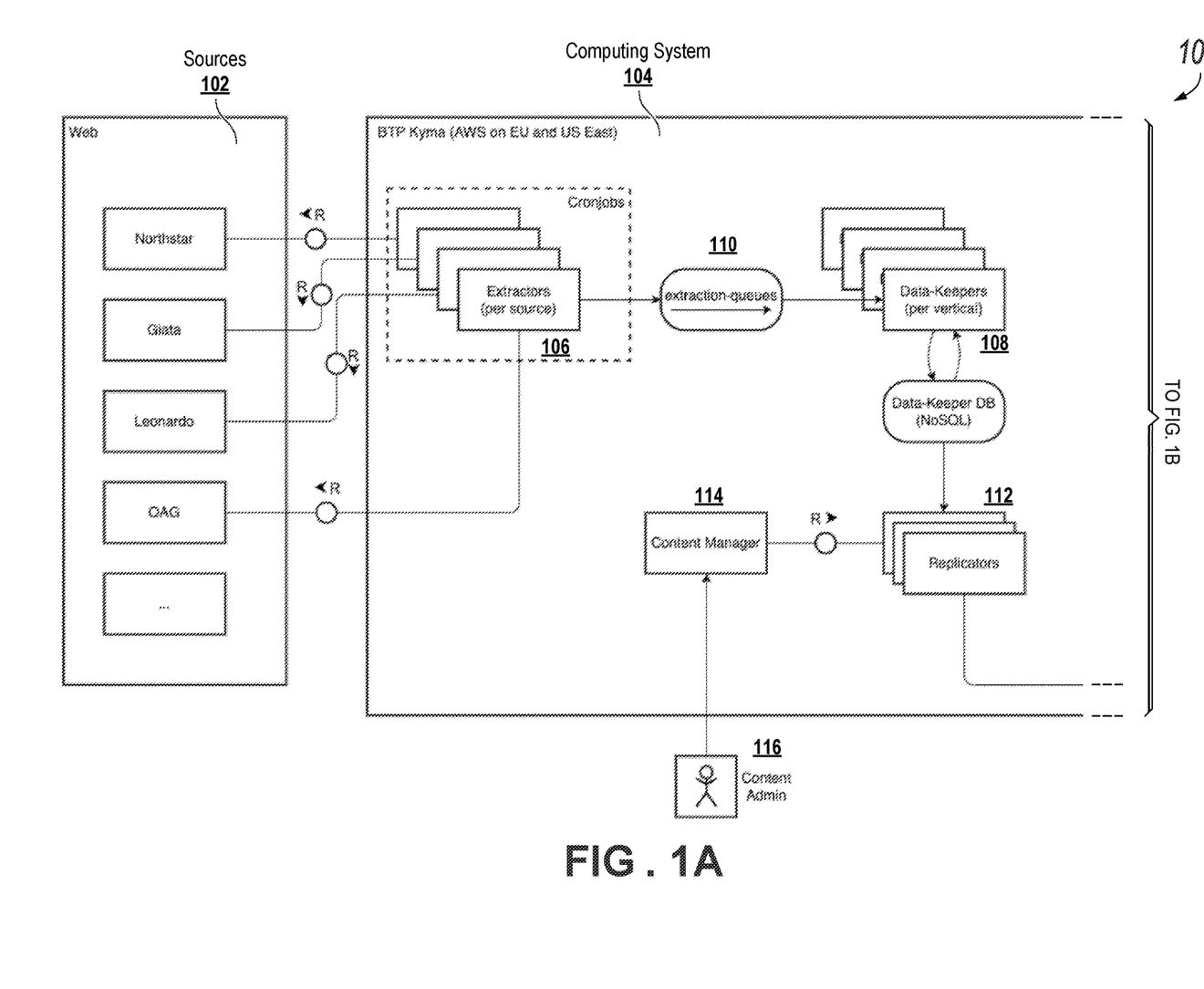
FIGS. 1A and 1B illustrate a schematic diagram of a system for maintaining travel databases and providing improved search results from them.
Figure 1B:
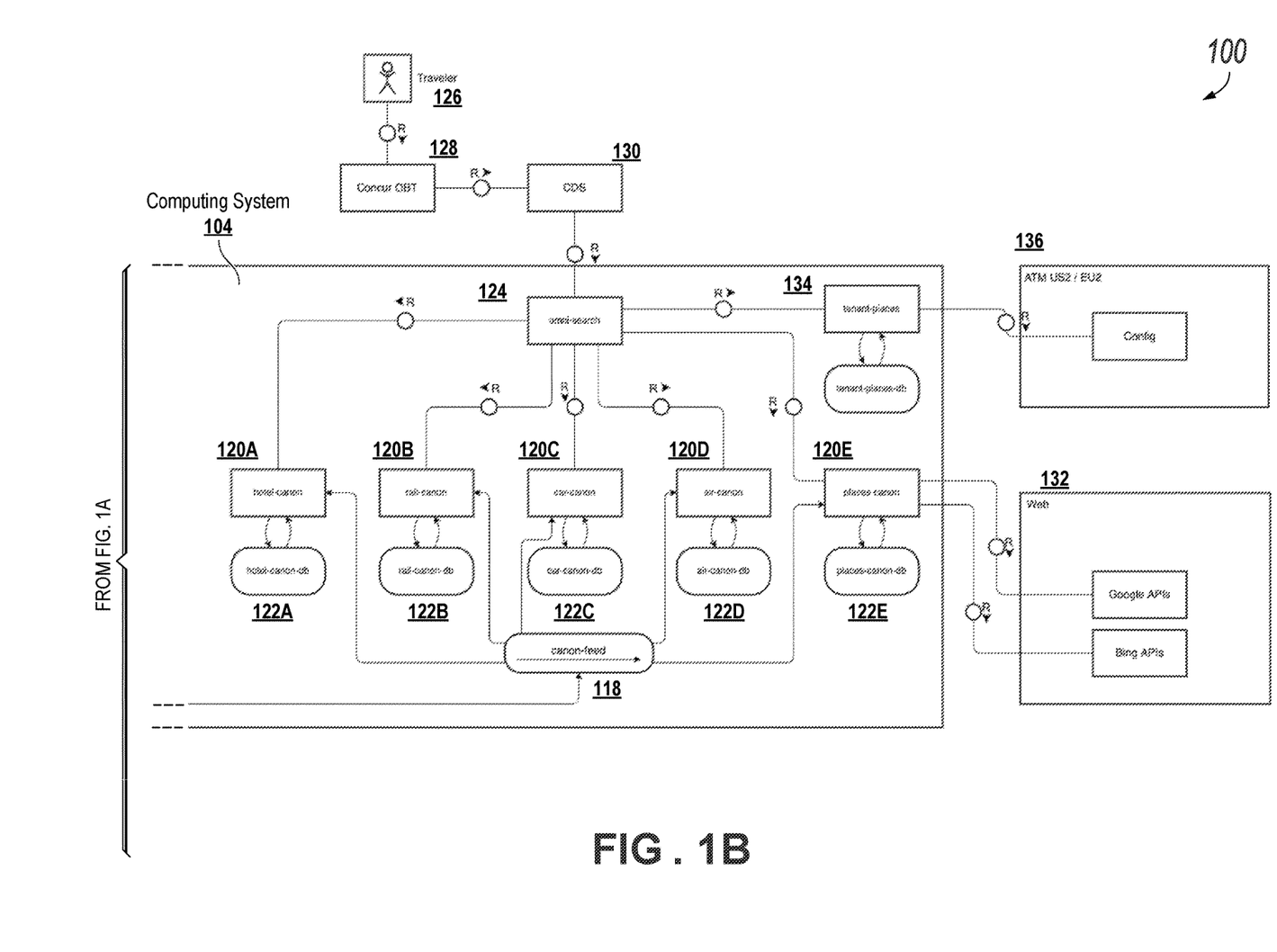

Turning to the illustrated example implementations, FIGS. 1A and 1B illustrate a schematic diagram of a system 100 for maintaining travel databases and providing improved search results from them. FIG. 1A includes sources 102, a computing system 104, extractors 106, data keepers 108, replicators 112, content manager 114, and content admins 116.

The computing system 104 can be a local (e.g., on premise) or remote (e.g., cloud) computing system that can operate independently or be part of a larger system. In some implementations, the computing system 104 is a containerized computing system such as a Kubernetes environment and can be scaled according to demanded computing resources.

In examples where computing system 104 is a Kubernetes environment, Kubernetes controls resources available to each container or service and enforces limits around an amount of CPU and memory made available to processes executing in the containers. Each container in a Kubernetes application has its own distinct file-system image, which is based on an OCI image specified in the Kubernetes application descriptor. Kubernetes allows containers which are run in the same application to share a set of folders-like a network share. A well-established pattern in the Kubernetes world is to separate applications into multiple containers, where different constraints are applied to each container in a particular solution.

Executing within the computing system 104, extractors 106 can be services that periodically poll web sources 102 using, for example, HTTP requests. The web sources 102 can be a plurality of different sources such as web page, third-party repositories (e.g., Northstar, Giata, etc.) and others. In some implementations, there is an extractor 106 that is unique to each source 102 and configured to withdraw data from that source 102 specifically. The extractor may get information from the source 102 and populate a software object (e.g., a JSON) with relevant fields in order to create structured travel information associated with the particular source.

Each extractor 106 can execute with a predetermined frequency, or on a predetermined schedule (e.g., as Cron jobs), and can generate a new software object each time. These software objects (one for each execution of an extractor 106, which each represent a particular data source 102) can be sent to an extraction queue 110 for processing by data keepers 108. In some implementations, each workload in the system 100 is in a separate computing container. In these implementations, each extractor 106 is in an individual container. Similarly, each data keeper 108 and extraction queue 110 can execute within their own container.

The extraction queues 110 can operate as a publish-subscribe service that enables asynchronous communication between the extractors 106 and the data keepers 108. In some implementations, communication between various services within computing system 104 and the extraction queues 110 can be an AMQP protocol or an MQTT protocol and can be managed by a message broker such as RabbitMQ or similar. In this manner, each extractor 106 can execute and publish data to the extraction queues 110 independently of the data keepers 108, which can consume the incoming software objects at their own frequency or based on independent trigger conditions.

Data keepers 108 can poll the extraction queue 110 for data associated with their category. In some implementations, there is a data keeper 108 for each vertical or canonical database 122 (as shown below with respect to FIG. 1B). The data keepers 108 can manage conflicting data from the extractors 106, as well as handle de-duplication of data to provide a single, up-to-date, accurate travel data object.

Conflicting data received from different extractors 106 can be resolved based on priority ratings associated with those extractors 106. For example, the extractor 106 providing data with the higher accuracy rating can be used where data conflicts. For example, a first data source may provide more accurate information, but may provide that information for a limited region, while a second data source may provide more information across a broader region, but the information is not as up to date. The data keepers 108 can select information from the first data source when duplicative information is found, but then use the second data source when information from the first data source is unavailable.

Following processing by a data keeper 108, a singular object for each bookable, or selectable element, can be generated. For example, the data keeper 108 configured to generate data for the hotel canonical database, may generate the following object in response to pulling information generated by extractors 106:

```
{
"_id_": "fda317fd-e7a9-4773-95dd-53e59cc26e0e",
  "name": "Four Seasons Hotel George V Paris",
  "address": "31, avenue George V",
  "zipCode": "75008",
  "city": "Paris",
  "country": "France",
  "website": "http://www.fourseasons.com/paris",
  "chain": {
    "id": "1102",
      "name": "Four Seasons Hotels and Resorts",
      "code": "FS"
    },
  "phone": "1-4952-7000",
  "phoneTollFree": "800-819-5053",
  "fax": "1-4952-7010",
  "amenities": [ "Air Conditioning (In Room)",
      "Balcony/Terrace",
      "Coffee Maker",
      "Daily Maid Service",
      "Iron",
      "Kitchen/Kitchenette",
      "Microwave Oven",
      "Mini-Bar",
      "Refrigerator",
      "Newspaper (Free)",
      "Non-Smoking Rooms",
      "Safe (In Room)",
      "Telephone",
      "Telephone (Voicemail)",
      "Television",
      "Television (Cable/Satellite)",
      "DVD/VCR",
     "In Room High-speed Internet Access",
      "In Room High-speed Internet Access Fee",
      "In Room Wireless Internet Access",
      "In Room Wireless Internet Access Fee"
    ],
  "facilities": [ "Administrative Services",
      "Business Center",
      "Computer Use Available",
      "Fax (For Guests)",
      "Photocopy Service",
      "Babysitting or Child Care",
      "Childrens Programs",
      "Common/Public Areas Accessible to Wheelchairs",
      "ATM/Bank",
      "Barber/Hair Stylist",
      "Car Rental",
      "Concierge Services",
      "Crib/Rollaway Bed",
      "Currency Exchange",
      "Gift Shop",
```

-continued

```
        "Laundry Room",
        "Laundry/ Dry Cleaning Service",
        "Multi-lingual Staff",
        "Room Service",
        "Pets Allowed",
        "Pet Amenities",
        "Pet Fee Ind",
        "Electronic Key",
        "Smoke Alarm in Rooms",
        "Sprinkler in Rooms",
        "Surveillance Cameras On Site",
        "Uniformed Security on Site",
        "Parking On Site Valet",
        "Parking On Site Free",
        "Common Area High speed Access",
        "Common Area High speed Access Fee Ind",
        "Common Area Wireless Access",
        "Common Area Wireless Access Fee Ind"
    ],
    "ratings": { "NTM Rating": "5",
        "OHG Classification": "10"
    },
    "coordinates": {
        "Latitude": "48.868668",
        "Longitude": "2.300857"
    },
    "references": {
        "Amadeus": [ "FSPAR837", "FSPAR214" ],
        "Sabre": [ "FS004065" ],
        "Leonardo": [ "H0E3G" ],
        "Giata": [ "15204" ],
        "Northstar": [ "280216" ]
    },
    "images": { "thumbnail": { "url":
"http://www.cfmedia.vfmleonardo.com/imageRepo/4/0/64/612/899/FPO
_PAR_195_A.jpg",
    "height": "70",
    "width": "70" } },
    "features": {
        "Number Of Floors": "8",
        "Total Number of Rooms": "244",
        "Year Built": "1928",
        "Year Last Renovated": "2014",
        "Check-In Time": "3:00 PM",
        "Check-Out Time": "12:00 PM",
        "Meeting Facilities": "X",
        "Number of Bars": "1",
        "Number of Restaurants": "1",
        "Architecture and Ambience": "Furnished with objets d'art
and antiques,
        lovingly restored in 1999 Soft Renovation
    },
    "description": "1928 landmark building 1 block from Champs-
Elysees - Rooms feature architectural detail,
    crystal chandelier
}
```

These objects, once generated, can be sent to a cannon feed 118 (illustrated below with respect to FIG. 1B) by one or more replicators 112. In some implementations, the replicators 112 are integrated with the data keepers 108. In some implementations, the replicators 112 are separate, and handle communication of the objects generated by the data keepers 108 to the cannon queue 118. In some implementations, that communication, similarly to the extraction queues 110, is an AMQP or MQTT network protocol and is handled by a message broker.

Content manager 114 can be a service that allows live modification and persistence of corrections within the objects generated by data keepers 108. For example, if there is a typographical error, or a manual modification that needs to be done, the content manager 114 can intercept objects at the replicators 112 and modify them before they are propagated to the cannon feed 118. A content administrator 116 can interact with these objects using the content manager 114.

FIG. 1B illustrates the cannon feed 118 which supplies the canonical database managers 120A-E with data to maintain their respective canonical databases 122A-E. A user 126 accesses the system using an online booking tool 128 interface with a common data services layer 130 to request information from a search gateway 124. Additional legacy databases and managers 134 as well as legacy data sources 136 can be provided. In some implementations, the CDMs 120A-E can supplement data received from the cannon feed 118 using additional external sources 132.

When a query is received from a user 126, the search gateway 124 performs a search of each database 122A-122E in order to retrieve results. Those results can then be sorted based on certain criteria such as distance, cost, relevance, availability, etc., and presented to the user 126 via the online booking tool 128.

Each CDM 120A-E maintains its respective canonical database 122A-E by ingesting the canon feed 118 independently of the other CDMs 120 and independently of data published to the feed by the replicators 112 (as illustrated in FIG. 1A). By having a single centralized cannon feed 118, the modularity of system 100 is improved. For example, an additional canonical database (e.g., Space-Cannon-DB) can be readily added, and subscribed to the cannon feed 118, without disrupting the remaining components of system 100. Similarly, additional data keepers 108, extractors 106, and replicators 112 can be added independent of the rest of system 100.

It should be noted that, while five canonical databases 122 and CDMs 120 are illustrated, more or fewer CDMs 120 and canonical databases 122 can be present within system 100. Additionally, as illustrated with the example of the places cannon database 122E and places CDM 120E additional supplemental sources 132 are possible.

The places CDM 120E can receive location information from the canon feed 118, but the particular location queried may not be present within the places canonical database 122E. For example, if the traveler (i.e., user) 126 queries a particular business, that business's location may not be routinely extracted by extractors 106 if the business is not generally associated with travel. If the search gateway 124 receives a query with a location that is not found in the places canonical database 122E, the places CDM 120E can query additional location services 132 (e.g., Google Maps API, or Bing API) in order to retrieve a latitude and longitude associated with that location. The latitude and longitude can then be used by the search gateway 124 to identify bookable elements in other canonical databases (e.g., canonical databases 122A-122D) to provide recommendations near where the user searched. In effect, the result is that if the user queries "Bass Pro Shop corporate headquarters," the search gateway 124 can recommend bus routes, or airports and flights near Springfield, Missouri, despite those headquarters not being typically associated with travel bookings.

The search gateway 124 can return an object that filters the results from each of the canonical databases 122A-E, which can look like, for example:

```
[
    {
        "id": "eb5caaf21da09ae0be85fni30819d43b",
        "name": "Charles de Gaulle",
        "type": "airport",
        "latitude": "49.003624",
        "longitude": "2.568629"
```

```
    },
    {
        "id": "bfadf20369738185d9838bfc9f22717b",
        "name": "Orly",
        "type": "airport",
        "latitude": "48.726255",
        "longitude": "2.365233"
    },
    {
        "id": "ef09086985db88ccfdadd94ff9e76bef",
        "name": "Paris Beauvais",
        "type": "airport",
        "latitude": "49.454753",
        "longitude": "2.111568"
    },
    {
        "id": "8fc148477037867a89315e0db6e56d5e",
        "name": "Hotel Beauchamps",
        "type": "hotel",
        "latitude": "48.870860",
        "longitude": "2.309240"
    },
    {
        "id": "cc6086f4524edf27185e6eb75a7e1ca2",
        "name": "Des Deux Iles Hotel",
        "type": "hotel",
        "latitude": "48.852327",
        "longitude": "2.354980"
    },
    {
        "id": "a3507eabd1754dc8089bd950b0bfb1e1",
        "name": "Hotel Des Tuileries",
        "type": "hotel",
        "latitude": "48.866093",
        "longitude": "2.331396"
    },
    {
        "id": "fc4d5fd78aab9f14b250000548019ca5",
        "name": "Paris - FR",
        "type": "place",
        "latitude": "48.864383",
        "longitude": "2.337936"
    },
    {
        "id": "339c72e26aa628685c754827cd87e9e3",
        "name": "Paris, Texas - US",
        "type": "place",
        "latitude": "33.661039",
        "longitude": "-95.556219"
    },
    {
        "id": "b0cc9c449cebfefb81044cc85a12e06f",
        "name": "Paris, Arkhansas - US",
        "type": "place",
        "latitude": "35.292188",
        "longitude": "-93.728225"
    },
]
```

The system 100 can include additional databases 134, which can be legacy databases from previous versions, or customer defined databases. These databases 134 can include custom information and configuration provided by external systems 136.

The following is an example process for utilization of computing system 104.

Data Intake:

Along with the design changes on the data intake, all data sources can be re-evaluated routinely not just for data review but also to replace existing data formats (e.g., static CSV files from FTP servers) to more up-to-date formats (e.g., API calls for XML or JSON).

The following provides further detail on the data intake flow, along with the respective components to ensure fully automated data ingestion data quality. The Extractors are responsible for connecting to data sources and modeling the unique representation for each data model. The HotelConnector, for example, can consume data from APIs and static files to compose the data model for hotels. Different sections from the hotel data model would have distinct data sources, all combined into a single representation.

The responsibility for evaluating if incoming data has to be created, merged or discarded is from the Data Keeper application. It should evaluate the incoming data and act accordingly to ensure consistent, unique and up-to-date data.

Data Keeper Persistence:

In order to store extracted records for data management and data quality purposes, a noSQL database can be chosen in order to allow for evolving data models. Each data keeper can "own" its collection and share the same database instance, which can reduce operating costs. The entity data model can be managed by the data-keeper instance.

Data De-Duplication on Data Keeper:

Instead of performing data de-duplication after the extraction, the goal is to achieve de-duplication during the extraction process. This can reduce the total time for data to be ready for consumption and also centralize the criteria used. Data de-duplication can be challenging since it can include multiple edge cases (e.g. same hotel with different address due to multiple receptions), having it being executed the same way regardless of the data source is an advantage. In the event more complex business logic is required to achieve the desired de-duplication, the canonical data stores can perform certain de-duplication since they might have a more comprehensive data across extractions.

Communication Between Extractors and Data Keepers:

Extractors can send a message to the specific message queue for each entity (e.g. single message for each hotel to the hotel queue), maintaining communication and processing in an atomic fashion on entity level. This enables asynchronous processing of the extracted data, resulting in easy horizontal scaling of Data Keepers.

Another reason to keep processing of an extracted entity into a single message is to enable accurate monitoring of the extraction process because every extracted entity can be traced back to its original message.

Replicator:

In order to provide data to be consumed across travel and other areas, the Replicator application can react to new/updated entries on the persistency and stream these extraction events to a queue on the target landscapes.

From there, the canonical data stores have visibility on the incoming data and can evaluate if it's relevant to be consumed.

In addition to replicating the extracted data, the Replicator can also receive data from the Content Manager application to enable manual changes or creation of data. By using the Replicator, manual data changes will have the same flow as extracted data.

Extensibility Concept for New Data Sources:

Once a new data source is intended to be consumed, either the extractor can be adjusted to gather the new data or a new extractor job can be created depending on the aspects like data volume or access protocol.

New data may require enhancement to the data model that represents the entity being extracted, for example, if a data provider now can offer sustainability indexes for hotels, the Hotel Extractor could consume this new data source and adjust the data model to contain this new information. Data Keeper would receive the new data model and store with the new information, older records for hotels would not contain sustainability indexes but newer ones would. In case older records have to be updated, merge logic is included on the data-keeper to react accordingly and update records.

Omni Search Gateway:

To enable distinct use cases that would need to consume canonical data from multiple data stores, the OmniSearch Gateway aims to enable flexibility not only on the data being queried but also on other aspects such as sorting and filtering. The communication between the gateway and data stores can follow a contract limited to the data querying scope, sorting and filtering can be handled on the gateway layer.

Canonical Data Stores:

These are the services which can store and manage their respective data, initial design alternative is to break is by vertical to segregate datatypes. The implementation will follow a full micro-service approach where specific DBs and technologies may be used depending on the data characteristics, this will help to enhance the performance for each data store (e.g. for simple caching of data Redis can be used, for more complex data models where detailed querying is required other DBs can be used).

The communication between the Omni Search gateway and the Canonical Data stores can use HTTPS. As overall an guideline, data stores can send the whole data entity to the omni-search gateway and all filtering and sorting to be performed on that layer (since these actions are performed on the whole dataset across data stores).

Another responsibility of the Canonical Data stores is to keep data updated, for that it can assess each feed event from the data extraction to the canon-feed queue and take relevant actions. Deletion of data can be handled by different event types for different operations.

Tenant and User Data:

Besides the canonical data stores, which would have the same data across tenants and data centers, there is another data store which will hold tenant and user data. The tenant-places data store will be responsible for serving company locations (tenant-specific) and home addresses (user-specific) to the omni-search gateway. This data enables use cases where travelers may be looking for their own company addresses or even their home address, company addresses will be fetched from Config bounded context and can be cached on Content side. For such search operations the Tenant-ID will be used to segregate access and further isolating the data, only requests received with a valid JWT containing this information will be accepted. Data synchronization between Config and tenant-places can be achieved by using change notification events where changes made to company addresses or user address will be notified to an SNS topic which will trigger tenant-places to fetch the updated records.

Figure 2:
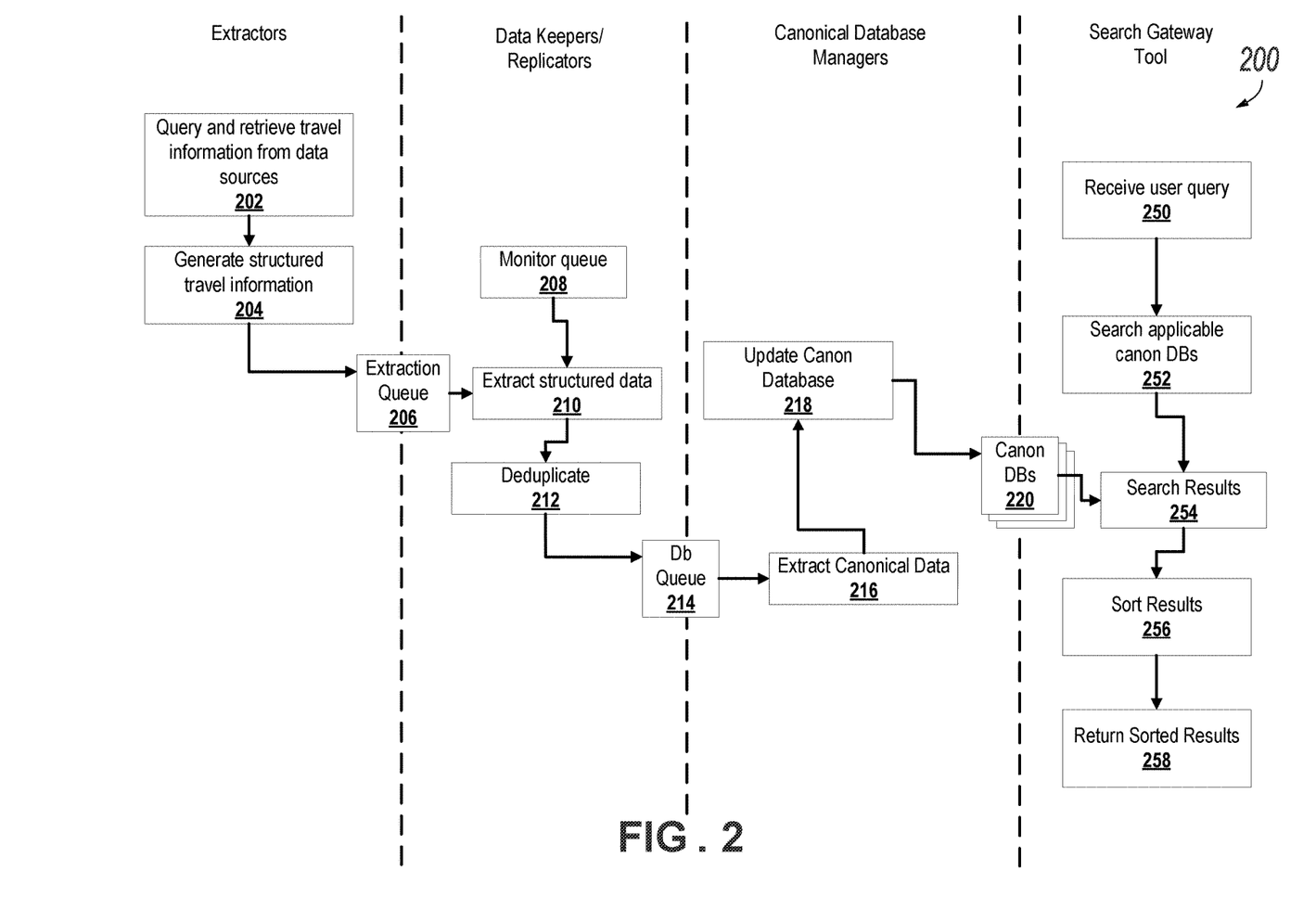
FIG. 2 is a flowchart of an example process 200 for maintaining travel databases, searching them, and presenting the results.

FIG. 2 is a flowchart of an example process 200 for maintaining travel databases, searching them, and presenting the results. It will be understood that process 200 and related methods may be performed, for example, by any suitable system, environment, software, and hardware, or a combination of systems, environments, software, and hardware, as appropriate. For example, a system comprising a communications module, memory storing instructions and other required data, and at least one hardware processor interoperably coupled to the memory and the communications module can be used to execute process 200. In some implementations, the process 200 and related methods are executed by one or more components of the system 100 described above with respect to FIGS. 1A and 1B, such as the computing system 104, and/or portions thereof. Further, it should be noted that process 200 does not necessarily proceed in a sequential manner, and elements of process 200 can happen repeatedly, in parallel or out of order as would be understood by one of ordinary skill in the art.

At 202, extractors query and retrieve information from multiple data sources. The extractors can query multiple websites (e.g., using an HTTP request), and can parse the received information based on the query.

At 204, the extractors generate structured travel information from the received information. In some implementations, the structured travel information is a JSON object that includes detailed information such as location, price, availability times, travel duration, amenities, source ID numbers, and other information. In some implementations, there is a unique extractor for each particular data source.

At 206, the structured information is published to an extraction queue. The extraction queue can operate under a publish/subscribe protocol that enables other entities to consume information or objects that are published on the queue. In some implementations the extraction queue is maintained by a message broker such as RabbitMQ.

At 208, data keepers monitor the extraction queue for relevant information to be published. In some implementations, there is a unique data keeper for each vertical, or category of data to be generated. The categories can include, but are not limited to hotels, car rentals, busses, rail/train transportation, airline travel, business locations, and cities.

At 210, when a relevant object is published to the extraction queue, the data keepers extract it. Because there are extractors for each unique data source, multiple objects in the same category that include the same data may be extracted.

At 212, multiplicative or conflicting information is de-duplicated. In some implementations, objects are given a priority based on their extractor or data source. In some implementations, multiplicative information is merged to a single data object to be sent to the database queue.

At 214, the de-duplicated objects are published as canonical (e.g., up to date) data to a database queue for consumption by the canonical database managers. The database queue can operate under a publish/subscribe protocol that enables other entities to consume information or objects that are published on the queue. In some implementations, the database queue is maintained by a message broker such as RabbitMQ. Because each data keeper corresponds to a particular CDM, each object in the published database queue can be automatically assigned to a category for consumption by that particular CDM.

At 216, the CDMs extract their associated canonical data. In some implementations, each CDM has its own independent sample rate, or polling frequency for the database queue. For example, the vehicle rental CDM may poll the database queue only once every six hours, while the air travel CDM may poll hourly.

At 218, with updated canonical data extracted, the CDMs update their associated canonical database (220), which is a repository of up-to-date travel information for a particular category of travel.

At 250, a search gateway tool receives a user query. In some implementations, the query is received via a user interface executing in a web browser that accesses the search gateway tool via a common data services layer.

At 252, the search gateway processes the query and performs a search of each canonical database. In some implementations, natural language processing or other semantic analysis and pre-processing is performed by the search gateway tool prior to performing a search of each canonical database. In some implementations, if a location is not returned from the "places" canonical database, an additional query is made to an external API, which can generate a location (e.g., latitude and longitude) to use in comparing or generating distances for objects in the remaining canonical databases.

At 254, search results are received from the canonical databases to the search gateway tool.

At 256, the results are sorted and filtered to be consumable to the user. The results can be sorted in various manners, as well as based on the category from which they come. For example, rail results may be primarily sorted based on location, while airline results are sorted by price, or availability. In some implementations, a relevance score is computed for each result, and only results above a predetermined relevance are not filtered. In some implementations, a set number of results (e.g., 5, 10 etc.) are selected to be presented based on the relevance score. In these implementations, the number of results can be determined by available screen space or UI space the user has available.

At 258, the sorted and filtered results are returned to the user. In some implementations, the query is returned via a user interface executing in a web browser that accesses the search gateway tool via a common data services layer.

Figure 3:
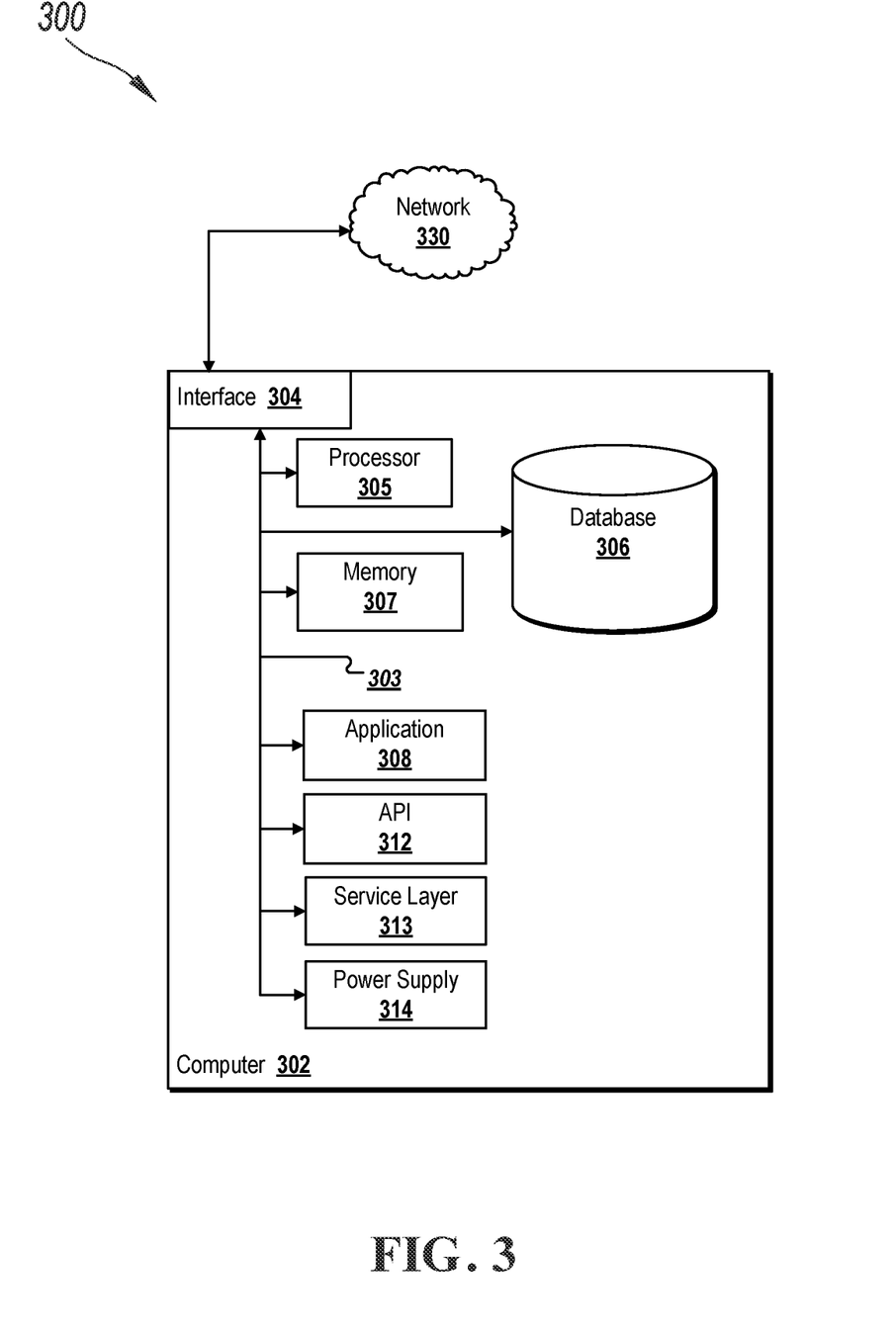
FIG. 3 is a block diagram illustrating an example of a computer-implemented system.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, system 300 includes a computer 302 and a network 330.

The illustrated computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the computer 302 can include an input device, such as a keypad, keyboard, or touch screen, or a combination of input devices that can accept user information, and an output device that conveys information associated with the operation of the computer 302, including digital data, visual, audio, another type of information, or a combination of types of information, on a graphical-type user interface (UI) (or GUI) or other UI.

The computer 302 can serve in a role in a distributed computing system as, for example, a client, network component, a server, or a database or another persistency, or a combination of roles for performing the subject matter described in the present disclosure. The illustrated computer 302 is communicably coupled with a network 330. In some implementations, one or more components of the computer 302 can be configured to operate within an environment, or a combination of environments, including cloud-computing, local, or global.

At a high level, the computer 302 is an electronic computing device operable to receive, transmit, process, store, or manage data and information associated with the described subject matter. According to some implementations, the computer 302 can also include or be communicably coupled with a server, such as an application server, e-mail server, web server, caching server, or streaming data server, or a combination of servers.

The computer 302 can receive requests over network 330 (for example, from a client software application executing on another computer 302) and respond to the received requests by processing the received requests using a software application or a combination of software applications. In addition, requests can also be sent to the computer 302 from internal users (for example, from a command console or by another internal access method), external or third-parties, or other entities, individuals, systems, or computers.

Each of the components of the computer 302 can communicate using a system bus 303. In some implementations, any or all of the components of the computer 302, including hardware, software, or a combination of hardware and software, can interface over the system bus 303 using an application programming interface (API) 312, a service layer 313, or a combination of the API 312 and service layer 313. The API 312 can include specifications for routines, data structures, and object classes. The API 312 can be either computer-language independent or dependent and refer to a complete interface, a single function, or even a set of APIs. The service layer 313 provides software services to the computer 302 or other components (whether illustrated or not) that are communicably coupled to the computer 302. The functionality of the computer 302 can be accessible for all service consumers using the service layer 313. Software services, such as those provided by the service layer 313, provide reusable, defined functionalities through a defined interface. For example, the interface can be software written in a computing language (for example, JAVA or C++) or a combination of computing languages, and providing data in a particular format (for example, extensible markup language (XML)) or a combination of formats. While illustrated as an integrated component of the computer 302, alternative implementations can illustrate the API 312 or the service layer 313 as stand-alone components in relation to other components of the computer 302 or other components (whether illustrated or not) that are communicably coupled to the computer 302. Moreover, any or all parts of the API 312 or the service layer 313 can be implemented as a child or a sub-module of another software module, enterprise application, or hardware module without departing from the scope of the present disclosure.

The computer 302 includes an interface 304. Although illustrated as a single interface 304, two or more interfaces 304 can be used according to particular needs, desires, or particular implementations of the computer 302. The interface 304 is used by the computer 302 for communicating with another computing system (whether illustrated or not) that is communicatively linked to the network 330 in a distributed environment. Generally, the interface 304 is operable to communicate with the network 330 and includes logic encoded in software, hardware, or a combination of software and hardware. More specifically, the interface 304 can include software supporting one or more communication protocols associated with communications such that the network 330 or hardware of interface 304 is operable to communicate physical signals within and outside of the illustrated computer 302.

The computer 302 includes a processor 305. Although illustrated as a single processor 305, two or more processors 305 can be used according to particular needs, desires, or particular implementations of the computer 302. Generally, the processor 305 executes instructions and manipulates data to perform the operations of the computer 302 and any algorithms, methods, functions, processes, flows, and procedures as described in the present disclosure.

The computer 302 also includes a database 306 that can hold data for the computer 302, another component communicatively linked to the network 330 (whether illustrated or not), or a combination of the computer 302 and another component. For example, database 306 can be an in-memory or conventional database storing data consistent with the present disclosure. In some implementations, database 306 can be a combination of two or more different database types (for example, a hybrid in-memory and conventional database) according to particular needs, desires, or particular implementations of the computer 302 and the described functionality. Although illustrated as a single database 306, two or more databases of similar or differing types can be used according to particular needs, desires, or particular implementations of the computer 302 and the described functionality. While database 306 is illustrated as an integral component of the computer 302, in alternative implementations, database 306 can be external to the computer 302. The database 306 can hold any data type necessary for the described solution.

The computer 302 also includes a memory 307 that can hold data for the computer 302, another component or components communicatively linked to the network 330 (whether illustrated or not), or a combination of the computer 302 and another component. Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307, two or more memories 307 or similar or differing types can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in the present disclosure. For example, application 308 can serve as one or more components, modules, or applications. Further, although illustrated as a single application 308, the application 308 can be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion or management circuits (including recharging, standby, or another power management functionality). In some implementations, the power supply 314 can include a power plug to allow the computer 302 to be plugged into a wall socket or another power source to, for example, power the computer 302 or recharge a rechargeable battery.

There can be any number of computers 302 associated with, or external to, a computer system containing computer 302, each computer 302 communicating over network 330. Further, the term "client," "user," or other appropriate terminology can be used interchangeably, as appropriate, without departing from the scope of the present disclosure. Moreover, the present disclosure contemplates that many users can use one computer 302, or that one user can use multiple computers 302.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A method comprising:
   querying, by a plurality of extractors, a plurality of separate data sources;
   receiving, at the plurality of extractors, travel information from the plurality of separate data sources;
   populating a software object with the travel information to generate structured travel information;
   submitting the structured travel information to an extraction queue;
   monitoring, by a data keeper of a plurality of data keepers, the data keeper associated with a particular category, the extraction queue for structured travel information of the particular category;
   extracting, by the data keeper, structured travel information of the particular category from the extraction queue, wherein extracting the structured travel information of the particular category comprises:
deduplicating the structured travel information of the particular category by merging data associated with a same travel element from different data sources of the plurality of separate data sources;
submitting, by the data keeper, the structured travel information to a database queue, the database queue comprising structured travel information of a plurality of categories;
extracting, by a canonical database manager (CDM) of a plurality of CDMs, the CDM associated with the particular category, the structured travel information of the particular category from the database queue; and
updating, by the CDM, a canonical database by incorporating the structured travel information of the particular category, the canonical database associated with the particular category.

2. The method of claim 1, wherein the travel information received from the plurality of data sources comprises:
fees;
one or more locations; and
amenities.

3. The method of claim 1, comprising:
receiving a user query comprising a location, and in response:
querying, by a places CDM, an API associated with a location service;
receiving location information associated with the location; and
updating a location canonical database with the location information.

4. The method of claim 1, wherein deduplicating the structured travel information of the particular category comprises:
prioritizing conflicting data associated with the same travel element from the different data sources based on the data source.

5. The method of claim 4, wherein the same travel element is at least one of:
a particular flight;
a particular rail connection;
a particular accommodation; or
a particular rental vehicle.

6. A non-transitory, computer-readable medium storing one or more instructions executable by a computer system to perform operations comprising:
querying, by a plurality of extractors, a plurality of separate data sources;
receiving, at the plurality of extractors, travel information from the plurality of separate data sources;
populating a software object with the travel information to generate structured travel information;
submitting the structured travel information to an extraction queue;
monitoring, by a data keeper of a plurality of data keepers, the data keeper associated with a particular category, the extraction queue for structured travel information of the particular category;
extracting, by the data keeper, structured travel information of the particular category from the extraction queue, wherein extracting the structured travel information of the particular category comprises:
deduplicating the structured travel information of the particular category by merging data associated with a same travel element from different data sources of the plurality of separate data sources;
submitting, by the data keeper, the deduplicated structured travel information to a database queue, the database queue comprising structured travel information of a plurality of categories;
extracting, by a canonical database manager (CDM) of a plurality of CDMs, the CDM associated with the particular category, the structured travel information of the particular category from the database queue; and
updating, by the CDM, a canonical database by incorporating the structured travel information of the particular category, the canonical database associated with the particular category.

7. The medium of claim 6, wherein the travel information received from the plurality of data sources comprises:
fees;
one or more locations; and
amenities.

8. The medium of claim 6, comprising:
receiving a user query comprising a location, and in response:
querying, by a places CDM, an API associated with a location service;
receiving location information associated with the location; and
updating a location canonical database with the location information.

9. The medium of claim 6, wherein deduplicating the structured travel information of the particular category comprises:
prioritizing conflicting data associated with the same travel element from the different data sources based on the data source.

10. The medium of claim 9, wherein the same travel element is at least one of:
a particular flight;
a particular rail connection;
a particular accommodation; or
a particular rental vehicle.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
querying, by a plurality of extractors, a plurality of separate data sources;
receiving, at the plurality of extractors, travel information from the plurality of separate data sources;
populating a software object with the travel information to generate structured travel information;
submitting the structured travel information to an extraction queue;
monitoring, by a data keeper of a plurality of data keepers, the data keeper associated with a particular category, the extraction queue for structured travel information of the particular category;
extracting, by the data keeper, structured travel information of the particular category from the extraction queue, wherein extracting the structured travel information of the particular category comprises:
deduplicating the structured travel information of the particular category by merging data associated with a same travel element from different data sources of the plurality of separate data sources;

submitting, by the data keeper, the deduplicated structured travel information to a database queue, the database queue comprising structured travel information of a plurality of categories;

extracting, by a canonical database manager (CDM) of a plurality of CDMs, the CDM associated with the particular category, the structured travel information of the particular category from the database queue; and updating, by the CDM, a canonical database by incorporating the structured travel information of the particular category, the canonical database associated with the particular category.

12. The system of claim 11, wherein the travel information received from the plurality of data sources comprises:
fees;
one or more locations; and
amenities.

13. The system of claim 11, comprising:
receiving a user query comprising a location, and in response:
querying, by a places CDM, an API associated with a location service;
receiving location information associated with the location; and
updating a location canonical database with the location information.

14. The system of claim 11, wherein deduplicating the structured travel information of the particular category comprises:
merging data associated with a same travel element from different data sources of the plurality of data sources; and
prioritizing conflicting data associated with the same travel element from the different data sources based on the data source.

15. The method of claim 1, wherein each extractor is a service that executes at a predetermined frequency.

16. The method of claim 1, wherein the software object is a JavaScript Object Notation (JSON) object.

17. The method of claim 1, wherein the data keeper is an application executing in a cloud-based Kubernetes environment.

18. The medium of claim 6, wherein the data keeper is an application executing in a cloud-based Kubernetes environment.

19. The system of claim 11 wherein the data keeper is an application executing in a cloud-based Kubernetes environment.

* * * * *